Patented Jan. 10, 1939

2,143,796

UNITED STATES PATENT OFFICE 2,143,796

STRENGTHENING GLASS

Charles John Phillips, Corning, N. Y., assignor to Corning Glass Works, Corning, N. Y., a corporation of New York No Drawing. Continuation of application Serial No. 6,094, February 11, 1935. This application July 30, 1937, Serial No. 156,607

8 Claims. (Cl. 49—89)

This invention relates to strengthening glass and more particularly to strengthening previously fabricated glass articles, and is a continuation of my co-pending application Serial Number 6,094, filed February 11, 1935.

The early work of De La Bastie (1874) and Siemens (1877) clearly indicates that improved mechanical and thermal strengths can be obtained by tempering, that is, by heating and quenching and that the greater the compressional forces that can be set into the surface layers of a glass article the greater will be its strength. De La Bastie and subsequent workers have realized that to obtain great compressional forces in the glass surface, it is necessary to establish a relatively wide difference between the temperature to which the glass is heated and the temperature of the quenching or tempering bath, but that these temperature differences must not be too great or the thermal shock to which the glass is subjected will introduce stresses which exceed its tensile strength and cause the glass to break.

Kowalski (1889), Brodmann (1894) and Graf (1925) in their experiments have proved that minute surface imperfections, such as scratches, bruises and even microscopic surface checks produced by fire polishing, have a great bearing upon the tensile strength of a glass article and that glass articles, the surfaces of which have been freed from weakening surface imperfections possess greater tensile strength than like articles from which such imperfections have not been removed. Among the methods employed for removing glass weakening surface imperfections is that known as fortifying.

Fortification of glass surfaces has come to be well defined in the glass art as that method of treating glass which consists of subjecting the glass surface as a whole to the action of an etching agent by means of which the entire surface layer is attacked so that any surface imperfections, such as scratches, bruises and the like, are either wholly removed or are so modified as to present a smooth contour which will not readily form a starting point for a break. Fortification and fortifying are used in this sense in the following claims, and fortified surface is used as defining the surface resulting from such treatment.

The beneficial effect of the fortification of glass articles was recognized by the early workers above mentioned who clearly pointed out the increase in transverse strength obtainable by such treatment. The major difficulty, however, with articles fortified according to past teachings is that while they initially possess increased strength, this is soon greatly reduced or even completely lost due to mechanical abrasion in ordinary handling and use.

Glass when heated is in an expanded state, that is to say, its molecules are farther apart than when it is cold. As a result, when glass is heated to a temperature which is satisfactory for tempering, i. e., to a temperature between its strain and softening points, it is in an expanded condition. Upon plunging the heated glass into a chilling medium the temperature of which is usually one-hundred or more degrees below the strain point temperature of the glass, the surface layers of the glass rapidly loose their heat and contract, while due to the low coefficient of heat conductivity of glass, the inside portions of the glass cool relatively slowly and consequently are expanded relative to the surface layers. Tempering in the following claims is used to define the sudden cooling of the surface of a glass body which has been heated to a temperature above the strain temperature of the glass from which the article is made to a temperature below the strain temperature of the glass, and tempered is used to define the condition resulting from such sudden cooling of glass. Such tempering puts the surface of the glass under a tremendous tension during the initial stages of cooling and unless the surface possesses a high degree of tensile strength breakage will occur. Consequently the surface of the glass must be free from surface imperfections such as cracks or checks, or the degree of temper obtainable in the glass will be materially limited.

The object of this invention is to increase the scope of utility of glass as a material from which articles of commerce can be fabricated.

Another object is to permit glass articles to be given a harder degree of temper and consequently a higher resistance to mechanical and thermal shock than has heretofore been possible.

The above and other objects may be attained by employing my invention which embodies among its features so combining the fortifying and tempering process that any weakening surface imperfections in the glass are removed and the glass therefore can be subjected to a higher degree of temper without danger of breakage than if it were not so fortified.

Other features embody fortifying the glass before heating it and chilling the glass in a bath which may or may not continue the fortifying step, or as an alternative, heating the glass in a fortifying and heating bath and subsequently chilling it in a bath which may or may not continue the fortifying-step.

In carrying my invention into practice, one method that I employ is to heat a glass article to a temperature of 750 degrees C. in an air furnace, and after being so heated place it in a molten bath consisting of a mixture of sodium hydroxide and potassium hydroxide, which is held at a temperature of 750 degrees C. Such bath fortified the glass in the manner described above. After remaining in this bath for approximately one minutes the article is removed and quickly submerged in a chilling bath which is held at a temperature of 20 degrees C. The average compressional stress in an article so treated was found to be thirty-three and one-third per cent (33⅓%) greater than that obtained in a like article having the same specifications and which had been subjected to as severe a chill as possible without the use of a fortifying bath.

Tempering like articles made of a borosilicate glass composition in accordance with the practice just recited shows an average improved chilled strength of forty-three per cent (43%) over that obtained on like articles chilled by prior art methods.

Another method of accomplishing desired results by employing my invention is to first fortify the article. This may be accomplished by subjecting it to an etching agent such, for instance, as hydrofluoric acid as commonly practiced. Immediately after fortifying the article, and with but a minimum of handling, it is heated to a temperature in the region between the strain point temperature and softening point temperature of the glass from which it is made. After being so heated for a period of time sufficient to establish a substantially equilibrium temperature throughout, the article is subjected to a chilling process which may take the form of air blasts or a liquid chilling bath into which the article is submerged. By thus preserving the surface of the glass, I am able to subject the article to a greater degree of chill than has been possible heretofore with unfortified tempered articles.

In some instances it may be found desirable to fortify the article while it is being chilled and for this purpose I first heat the article to the desired temperature, preferably at a temperature between the strain point and the softening point of the glass from which the article is made and then submerge it into a chilling bath composed of a molten mixture of sodium hydroxide and potassium hydroxide. In tempering articles made from an ordinary lime glass, for instance, the article is heated to a temperature of 650° C. for a period of time long enough for it to reach an elevated equilibrium temperature throughout its thickness, after which it is submerged in the chilling bath which is held at a temperature of 350 degrees C. Due to the attack of the chilling bath upon the glass surface, it will withstand the severe chill to which it is subjected without danger of rupture and as a consequence a higher degree of strain can be produced in a glass article by this method than would be possible by any other method known to me.

It is obvious that where desired the article can be heated in a fortifying bath and also chilled in a fortifying bath without departing from the scope of my invention. Moreover, other mixtures of molten salts which are strongly alkaline, such as alkali cyanides, alkali carbonates and the like, can be employed as either heating and fortifying media or as chilling baths without departing from the scope of my invention.

I claim:

1. The method for improving the strength of glass articles which includes fortifying the article and then immediately tempering it.

2. The method for improving the strength of glass articles which includes fortifying and simultaneously heating the article to a temperature above the strain temperature of the glass from which the article is made and then immediately cooling it suddenly.

3. The method for improving the strength of glass articles which includes fortifying the article and then tempering it before the effects of fortifying have been destroyed.

4. The method for improving the strength of a glass article which includes fortifying the article, heating the article to a temperature above the strain temperature of the glass from which the article is made suddenly cooling it by immersing it in a bath held at a temperature below the strain temperature of the glass before the effects of fortification have been destroyed.

5. The method for improving the strength of a glass article which includes heating the article to a temperature above the strain temperature of the glass from which the article is made in a fortifying medium and then immediately chilling the article to a temperature below the strain temperature of the glass by immersing it in a bath at a materially lower temperature before the effects of fortification have been destroyed.

6. The method for improving the strength of a glass article, which includes heating the article to a temperature above the strain temperature of the glass from which the article is made, fortifying the article while it is so heated and immediately chilling the article by suddenly immersing it in a bath held at a temperature below the strain temperature of the glass.

7. The method for improving the strength of a glass article which includes heating it to a temperature above the strain temperature of the glass from which the article is made, fortifying the article while substantially at said temperature and suddenly chilling the heated and fortified article by subjecting it to a temperature below the strain temperature of the glass.

8. The method for improving the strength of a glass article which includes heating the article to a temperature above the strain temperature of the glass from which the article is made, fortifying the article while it is being so heated, and suddenly chilling the article in a bath containing the same ingredients as that in which the article was fortified.

CHARLES JOHN PHILLIPS.